US006721608B1

(12) United States Patent  
Rutherford

(10) Patent No.: US 6,721,608 B1
(45) Date of Patent: Apr. 13, 2004

(54) PARTITIONED CONTROL STRUCTURE

(76) Inventor: Mark L. Rutherford, 2112 Fairfax Ave., Apt. 116, Nashville, TN (US) 37212

( * ) Notice: Subject to any disclaimer, the term of this patent is extended or adjusted under 35 U.S.C. 154(b) by 0 days.

(21) Appl. No.: 09/531,057

(22) Filed: Mar. 20, 2000

(51) Int. Cl.[7] .............................................. G05B 13/02
(52) U.S. Cl. ............................. 700/28; 700/29; 700/37; 700/45
(58) Field of Search ............................. 700/20, 28, 29, 700/30, 37, 44–45, 54, 19

(56) References Cited

U.S. PATENT DOCUMENTS

| | | | |
|---|---|---|---|
| 4,663,703 A | | 5/1987 | Axelby et al. ............... 364/149 |
| 4,814,968 A | | 3/1989 | Fukumoto .................... 364/150 |
| 4,842,089 A | | 6/1989 | Kimbrough et al. ........ 180/79.1 |
| 4,860,215 A | * | 8/1989 | Seraji .......................... 700/260 |
| 5,034,312 A | | 7/1991 | Saito ........................... 430/569 |
| 5,394,322 A | * | 2/1995 | Hansen ......................... 700/37 |
| 5,455,763 A | * | 10/1995 | Feingold ...................... 700/29 |
| 5,481,453 A | * | 1/1996 | Desantis ...................... 700/42 |
| 5,561,599 A | * | 10/1996 | Lu ................................ 700/44 |
| 5,791,160 A | * | 8/1998 | Mandler et al. .............. 62/611 |
| 6,162,488 A | * | 12/2000 | Gevelber et al. .............. 427/8 |
| 6,546,295 B1 | * | 4/2003 | Pyotsia et al. ................ 700/37 |

OTHER PUBLICATIONS

Debelak, Kenneth A. et al. Partitioned Error Control. *Ind. Eng. Chem. Res.* 38 : 4113–4119 (1999).

Lundstrom, Petter et al. Two–Degree–of–Freedom Controller Design for an Ill–Conditioned Distillation Process Using $\mu$–Synthesis. *IEEE Transactions on Control Systems Technology*, 7: No. 1, 12–21 (1999).

Limebeer, D.J.N. et al. On The Design of Robust Two Degree of Freedom Controllers. *Automatica* 29: No. 1, 157–168 (1993).

van Diggelen, F. et al. A Hadamard Weighted Loop Shaping Design Procedure. *Proceedings of the 31st IEEE Conference on Decision and Control.*

Skogestad, Sigurd et al. Robust Control of Ill–Conditioned Plants: High–Purity Distillation. *IEEE Transactions on Automatic Control* 33 No. 12, 1092–1105 (1988).

Lopez, A.M., Tuning Controllers With Error–Integral Criteria. *Instrumentation Technology* 57–62 (1967).

Rovira, Alberto A., Tuning Controllers for Setpoint Changes. *Instruments & Control Systems* 42: 67–69 (1969).

Tyreus, Bjorn D., et al. Tuning PI Controllers for Integrator/Dead Time Processes. *Ind. Eng. Chem. Res.* 31: 2625–2628 (1992).

Murrill, Paul W., The Controller; The Adjustment of Controllers; Controllers and Degrees of Freedom. *Automatic Control of Processes.* International Textbook Company, Scranton, Pennsylvania Ch. 16, 17, 18 319–385 (1967).

(List continued on next page.)

*Primary Examiner*—Ramesh Patel
*Assistant Examiner*—Ronald D Hartman, Jr.
(74) *Attorney, Agent, or Firm*—Jones Day

(57) ABSTRACT

An apparatus for controlling a two degree of freedom process comprises a first controller, a second controller, and a process model. The three components are oriented in such a way that the first controller receives input from a first variable and the second controller receives input from a second variable. The process model is a model of the process process and provides feedback to the first controller. Furthermore, the orientation of the controllers isolates the first controller from the second variable and isolates the second controller from the first variable when the process model matches the process. Since each controller shapes a response to only one variable, the transfer functions of each controller can be chosen to meet stringent performance standards.

39 Claims, 2 Drawing Sheets

OTHER PUBLICATIONS

Skogestad, Sigurd et al. Classical Feedback Control. *Multivariable Feedback Control Analysis and Design*, John Wiley & Sons Ltd., West Sussex PO19 1US, England Ch. 2 15–62 (1996).

Astrom, Karl J. et al. Disturbance Models; Design: An Overview; Adaptive Control. *Computer Controlled Systems Theory and Design*, Prentice–Hall, Inc., Englewood Cliffs, NJ Ch. 6, 7, 14 121–173; 343–360 (1984).

Morari, Manfred et al. Fundamentals of SISO Feedback Control. *Robust Process Control*, Prentice Hall, Inc., Englewood Cliffs, NJ Ch 2 11–38 (1989).

Horowitz, Isaac M. Design of Feedback Control Systems for Independent Control of Transmission and Sensitivity Functions. *Synthesis of Feedback Systems*, Academic Press New York and London Ch. 6 246–298 (1963).

* cited by examiner

PARTITIONED CONTROL STRUCTURE

FIELD OF THE INVENTION

The present invention relates generally to control systems, and more particularly to process control systems in a two degree of freedom system.

BACKGROUND OF THE INVENTION

A process control system implements a controller to shape the response of a process to an input signal. The control system can add gain, time varying properties, frequency components, or a combination of these characteristics to the process signal. By properly choosing these characteristics, the control system can stabilize the response of the process, determine overshoot, on set acceptable error bounds and satisfy other performance criteria.

A two degree of freedom controller is generally implemented in a two degree of freedom system. Such a two degree of freedom system could consist of a setpoint and a disturbance. Within this system, the controller should track the setpoint and reject any disturbances. Controllers of this type, for example, include the precompensator 10 of FIG. 1.

The precompensator 10 of FIG. 1 includes a prefilter 12 and a load controller 14. These two control elements 12 and 14 shape a process input 16 for a process 18. The prefilter 12 shapes a prefilter response 20 to an input variable 22. The load controller 14 shapes the input 16 to the process 18 based on the prefilter response 20 and a process state 30 that is feedback for the system. The process state 30 is altered by a second variable 32 and the transfer function 36 of the second variable 32.

In the configuration of the precompensator 10, the load controller 14 must shape the process input 16 based in part on the prefilter response 20. Any inaccuracies from error in the prefilter 12 are propagated through the load controller 14.

SUMMARY OF THE INVENTION

In accordance with a principal feature of the invention, a control structure comprises a first controller, a second controller, and a process model. The first controller and the process model are configured in a partitioned feedback loop to receive input from a first variable. The second controller is configured in parallel with the first controller to receive input from a partitioned feedback loop and feedback from a process. The process receives input from a second variable.

In accordance with another principal feature of the invention, the control structure comprises the first controller, the second controller, and the process model. The first controller shapes a response to the first variable. The process model predicts the output of the process. The second controller is isolated from the first input and receives its input from the predicted output and feedback from a process output. The second controller shapes a response to an error between the predicted output and the measured output.

DESCRIPTION OF A PREFERRED EMBODIMENT

Figure 1:
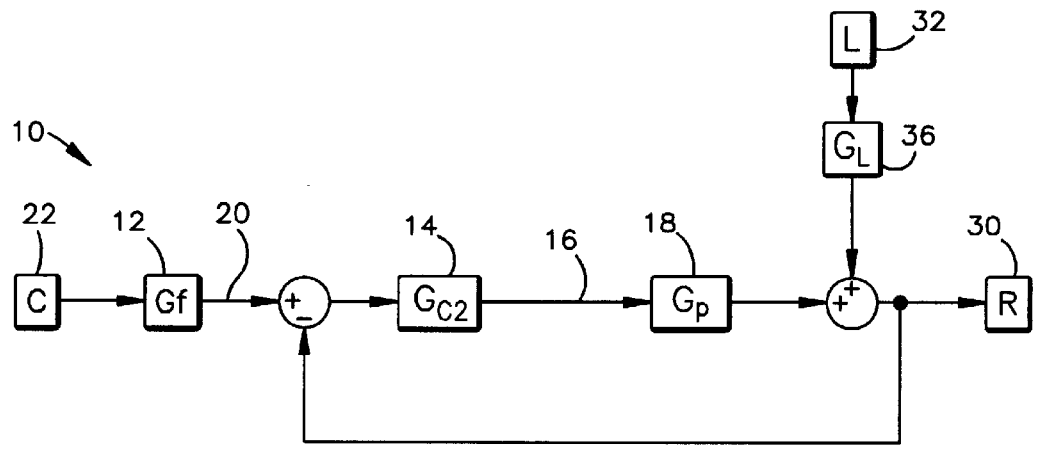
FIG. 1 is a schematic diagram of a prior art two degree of freedom control system.
Figure 2:
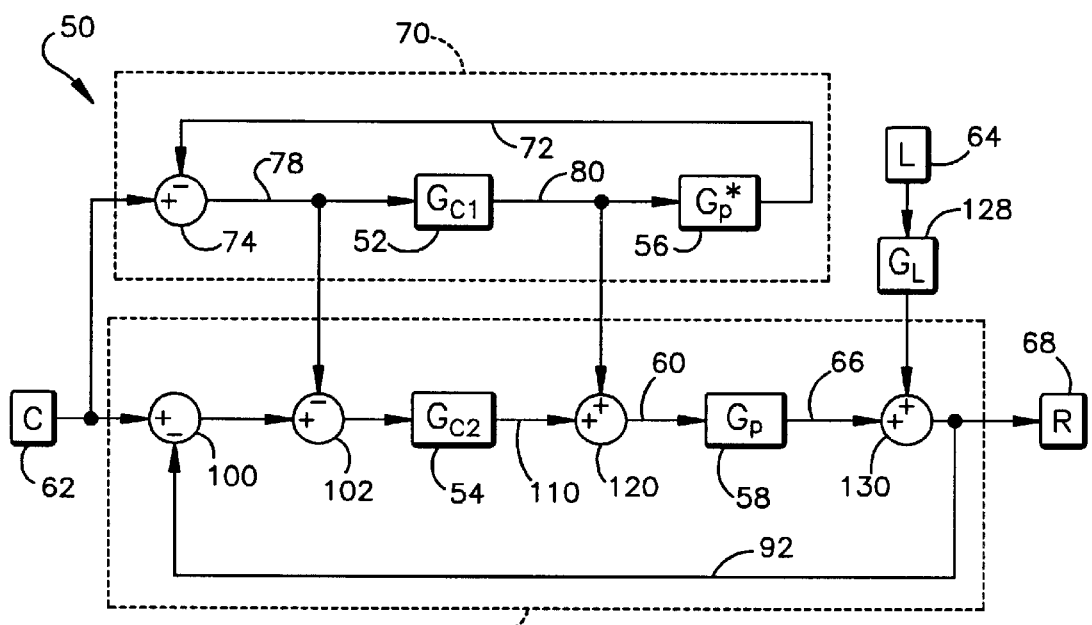
FIG. 2 is a schematic diagram of a two degree of freedom control system comprising a preferred embodiment of the present invention.

A control structure 50 comprising a preferred embodiment of the present invention is shown in FIG. 2. The control structure 50 comprises a first controller 52, a second controller 54, and a process model 56. These three components of the control structure 50 control a system process by regulating a process 58 with a process control signal 60 based on values of a first variable, C, 62 and process feedback. The process feedback is the sum of a second variable ,L, 64 and a partial process output 66. The second variable 64 is an external component to the system process to effect the process output 68.

The first controller 52 and the process model 56 are located in a partitioned feedback loop 70. Within the partitioned feedback loop 70, the first controller 52 and the process model 56 are part of the forward path of the partitioned loop 70. A feedback signal 72 is a predicted process output that is fed back to the first controller 52 from the process model 56. The first variable 62 is the input of the partitioned feedback loop 70. A first difference junction 74 calculates the difference between the first variable 62 and the predicted process output 72.The output from the first difference junction 74 is a predicted error 78 of the process 58. The transfer function, $G_{C1}$, of the first controller 52 receives the predicted error 78 as an input and outputs an idealized control signal 80. The idealized control signal 80 is the input for the process model 56. The process model transfer function, $G_P^*$, takes the idealized control signal 80 as an input and generates the predicted process output 72.

The second controller 54 is located on a main loop 90 of the control structure 50. The second controller 54 is parallel to the first controller 52. The second controller 54 feeds a control signal into the process 58. A feedback signal 92 is the value of the process output 68. A second difference junction 100 calculates the difference between the first variable 62 and the measured output 92. The output from the second difference junction 100 is fed into a third difference junction 102. The third difference junction 102 calculates the difference between the output of the second difference junction 100 and the predicted error 78 from the partitioned feedback loop 70.

The transfer function $G_{C2}$, of the second controller 54 manipulates the output of the third difference junction 102 to generate a second control signal 110. A first summing junction 120 sums the second control signal 110 with the idealized control signal 80 from the partitioned feedback loop 70. The output of the first summing junction 120 is the process control signal 60 for the process 58. The partial process output 66 is the result of the transfer function, $G_P$, of the process 58 responding to the process control signal 60.

The second variable 64 acts upon the process system through a transfer function $G_L$ in a load process 126. The output of the load process 126 is a load output 128. The load output 128 is summed with the partial process output 66 by a second summing junction 130. The output of the second summing junction 130 is the process output 68. The second variable 64 thus adds a disturbance to the process output 68.

As can be seen by following the signals through the block diagram, the first variable 62 is shaped by the first controller 52 when the process model 56 matches the process 58. The difference junctions in the loops 70 and 90 isolate the second controller 54 from the first variable 62. The input to the second controller 54 then consists of the difference between the predicted process output 72 and the feedback of the process output 68. This difference is the value of the load disturbance created by the second variable 64 when the process model 56 matches the process 58.

The partitioned feedback loop 70 is isolated from the second variable 64. No signal is received in the partitioned feedback loop 70 from the main loop 90. The first controller 52 is isolated from any input from the second variable 64. Since each controller 52 and 54 is isolated from one of the variables 62 and 64, each controller can be independently designed for the desired response to a single variable.

The performance of the process model 56 can be measured by the response of the second control signal 110 to a change in the first variable 62. A change in the first variable 62 will not cause the second control signal 110 to change if the process model 56 matches the process 58. If the process model 56 does not match the process 58, the second control signal 110 will vary. The second control signal thus is a measure of fitness of the process model 56 to the process 58 and serves as an indicator to the need to adjust the process model 56 to more correctly model the process 58 as the process 58 changes.

The structure 50 can also be examined analytically by examining the closed loop transfer function. The closed loop transfer function for the control structure 50 is given by:

$$R = \left[\frac{G_{C2}G_P}{1+G_{C2}G_P} + \frac{(G_{C1}-G_{C2})G_P}{(1+G_{C2}G_P)(1+G_{C1}G_P^*)}\right](C) + \frac{G_L}{1+G_{C2}G_P}(L)$$

From this closed loop transfer function, it can again be shown that when the process model 56 matches the process 58, or $G_P = G_P^*$, the closed loop transfer function reduces to:

$$R = \frac{G_{C1}G_P}{1+G_{C1}G_P}(C) + \frac{G_L}{1+G_{C2}G_P}(L)$$

wherein each controller 52 and 54 acts upon only one of the input variables 62 and 68. The first controller 52 shapes a response to the first variable 62 and the second controller 54 shapes a response to the second variable 64.

Since each of the controllers 52 and 54 in the control structure 50 is individually set to a variable, the control structure 50 can use high performance controllers to shape the response to the input variables 62 and 64. One such use of this control structure 50 is in a system where the variables are a set point and a load disturbance. The set point variable is a variable which is the desired value of the process output 68. A load disturbance is an unwanted input to the system that may or may not be measured but is undesirable.

The object of the control structure 50 would then be to match the set point and reject the load disturbance. The controller 52 associated with the set point variable would be tuned to adjust the process output 68 to the new value of the set point based on specific performance criteria for the system. For instance, it may be important to avoid overshoot and to have a rise time that is prescribed to be relatively fast for this set point change. The load rejection performed by the other controller 54 can be tuned to a different set of performance criteria. The transfer function of the second controller 54 can be chosen based on properties of the load and the desired performance criteria of the load rejection. For instance, overshoot is a particularly undesirable response to a disturbance in many systems. These distinct performance measures may not be attainable in a control system where both set point and load disturbances are routed through a single controller.

In the control structure 50, the controllers 52 and 54 are initially tuned for performance based on the modeled properties of the process 58 and the load process 128. The parameters of the transfer functions $G_{C1}$ and $G_{C2}$ as well as the order of these transfer functions are chosen to make the control signals 80 and 110 sum to the desired process control signal 60 to produce a desired process output 68. More robust designs for the control system would allow the transfer functions $G_{C1}$ and $G_{C2}$ of the controllers 52 and 54 to be self-tuned by techniques incorporated in controllers such as a model referenced adaptive controller or a self-tuning adaptive controller.

Figure 3:
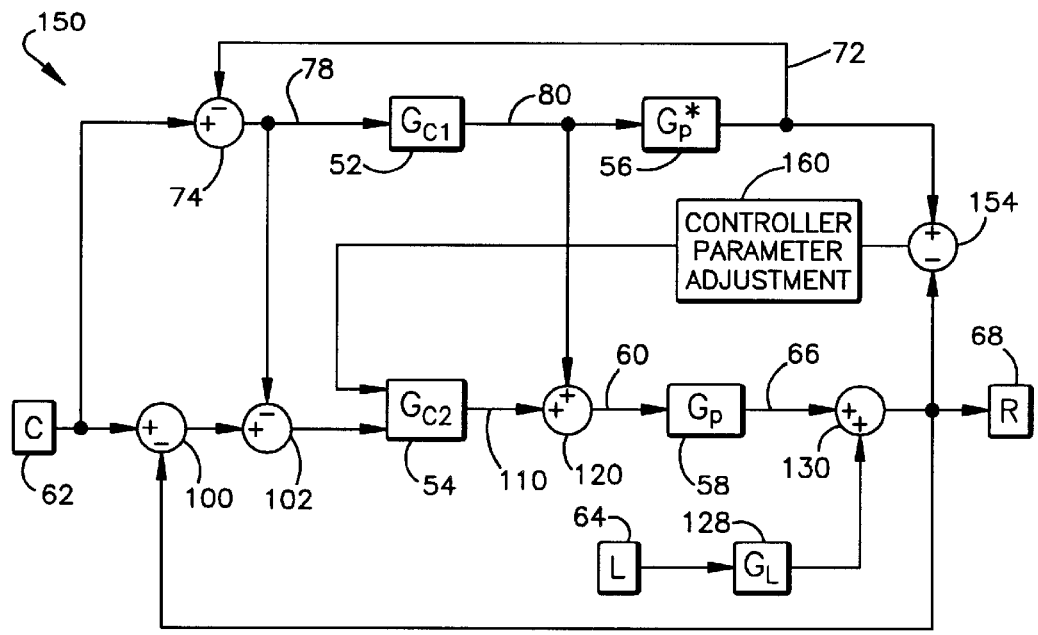
FIG. 3 is a model referenced adaptive control system that includes the preferred embodiment of the present invention.

A control structure 150 of FIG. 3 incorporates the control structure 50 in a model referenced adaptive controller. In this control structure 150, the difference between the predicted process output 72 and the process output 68 is taken in a difference junction 154. The difference junction 154 passes the difference to a parameter adjustment algorithm 160. The parameter adjustment algorithm 160 adjusts the parameters of the transfer function $G_{C2}$ of the second controller 54. The magnitude of the adjustment is based on the difference between the predicted process output 72 and the process output 68. In this control structure 150 the second controller 54 is tuned while the system is operating.

Figure 4:
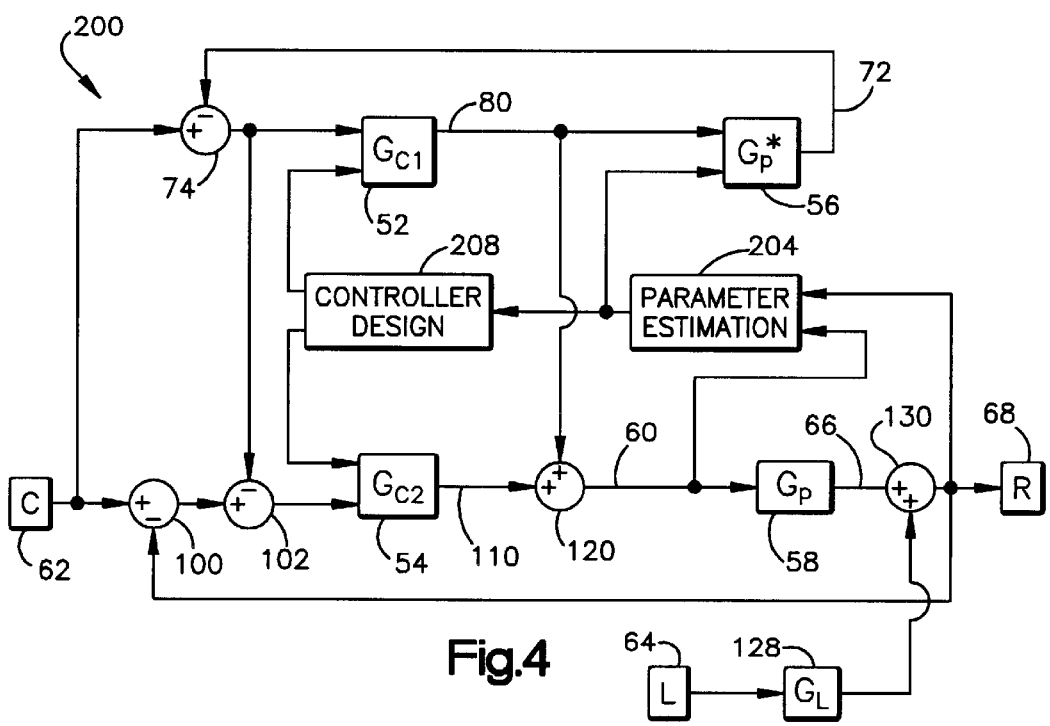
FIG. 4 is a self-tuning adaptive control system that includes the preferred embodiment of the present invention.

A control structure 200 of FIG. 4 incorporates the control structure 50 in a self-tuning adaptive controller. The control structure 200 comprises a parameter estimation block 204 and a controller design block 208. The parameter estimation 204 receives input from the measured variable 68 and the process control signal 60. The parameter estimation block 204 adjusts the parameters for the process model 56 and a set of parameters that are passed to the controller design block 208. The controller design block 208 takes the input from the parameter estimation block 204 to adjust the parameters of the transfer functions $G_{C1}$ and $G_{C2}$ of the first and second controllers 52 and 54. In this control structure 200 both controllers 52 and 54 and the process model 56 are tuned while the system is operating.

Partitioned control structure can also be implemented in a multiple input/multiple output(MIMO) system. In such a system, inputs such as the first and second variables 62 and 64 would be introduced as a vector to the control structure. The output 68 would also be a vector. Within the control structure, the transfer functions could be a matrix of functions. The process model 56 would include a model for how the process 58 would react to each input in the input vector.

The invention has been described with reference to a preferred embodiment. Those skilled in the art will perceive improvements, changes, and modifications. Such improvements, changes, and modifications are intended to be within the scope of the claims.

What is claimed is:

1. A control structure comprising:
a first controller;
a second controller; and
a process model;
said first controller and said process model being configured in a partitioned feedback loop so as to receive input from a first variable;
said second controller being configured in parallel with said first controller and further being operative to receive input from said partitioned feedback loop and to receive feedback from a process in a main feedback loop, said process receiving input from a second variable; and
said partitioned feedback loop being configured to generate said input from said partitioned feedback loop to said second controller independently of feedback from said main feedback loop.

2. A control structure as defined in claim 1 wherein said process model comprises a model of said process in said main feedback loop.

3. A control structure as defined in claim 2 wherein said first controller is isolated from said second variable and is operative to shape a response to said first variable, and said second controller is isolated from said first variable and is operative to shape a response to said second variable.

4. A control structure as defined in claim 2 wherein each of said controllers can be tuned independently.

5. A control structure as defined in claim 1 wherein said first variable is a set point.

6. A control structure as defined in claim 5 wherein said first controller is tuned to match said set point.

7. A control structure as defined in claim 1 wherein said second variable is a disturbance.

8. A control structure as defined in claim 7 wherein said second controller is tuned to reject said disturbance.

9. A control structure as defined in claim 1 wherein said process model is an approximation of said process, said process model being tuned until said second controller is isolated from a change in said first variable.

10. A control structure as defined in claim 1 wherein said first controller and said second controller are self-tuned.

11. A control structure as defined in claim 10 wherein said controllers are tuned by a parameter estimation method.

12. A control structure as defined in claim 10 wherein said second controller is tuned by a model reference method.

13. A control structure as defined in claim 1 wherein said first variable is a single input to the control structure.

14. A control structure as defined in claim 13 wherein said variable is a set point.

15. A control structure comprising:
   a first controller operative to shape a response to a variable;
   a process model operative to predict output of a process to said variable, said first controller and process model configured in a partitioned feedback loop; and
   a second controller operative to receive feedback from a process output in a main feedback loop and further operative to receive an input from said predicted output in order to shape a response to an error between said predicted output and said process output;
   wherein said partitioned feedback loop is configured to generate the predicted output independently of feedback from the main feedback loop.

16. A control structure as defined in claim 15 wherein said controller is tuned to match said set point.

17. A control structure as defined in claim 15 wherein said process receives input from a second variable.

18. A control structure as defined in claim 17 wherein said second variable is a disturbance.

19. A control structure as defined in claim 18 wherein said second controller is tuned to reject said disturbance.

20. A control structure as defined in claim 15 wherein said first controller and said second controller are self-tuned.

21. A control structure as defined in claim 20 wherein said controllers are tuned by a parameter estimation method.

22. A control structure as defined in claim 20 wherein said second controller is tuned by a model reference method.

23. A control structure as defined in claim 15 wherein said first variable is a single input to the control structure.

24. A control structure comprising:
   a first controller operative to shape a response to a first variable;
   a process model operative to generate a predicted output of a process to said first variable, said first controller and process model configured in a partitioned feedback loop; and
   a second controller operative to shape a response to an error, said second controller operative to receive feedback from the process output in a main feedback loop;
   wherein said partitioned feedback loop is configured so that the process model generates the predicted output independently of feedback from the main feedback loop, and said error, being the difference between said predicted output and a process, is a measure of fitness of said process model to said process, said second controller being operative to test said model such that when said process model substantially matches said process said second controller minimally responds to a change in said first variable.

25. A control structure as defined in claim 24 wherein said first variable is a set point.

26. A control structure as defined in claim 25 wherein said first controller is tuned to match said set point.

27. A control structure as defined in claim 25 wherein said second controller is tuned to reject said disturbance.

28. A control structure as defined in claim 24 wherein said second variable is a disturbance.

29. A control structure as defined in claim 24 wherein said first controller and said second controller are self-tuned.

30. A control structure as defined in claim 29 wherein said controllers are tuned by a parameter estimation method.

31. A control structure as defined in claim 29 wherein said second controller is tuned by a model reference method.

32. A control structure as defined in claim 24 wherein said first variable is a single input to the control structure.

33. A control structure, comprising:
   a partitioned control loop, comprising:
     a first controller operative to receive a predicted error signal proportional to the difference between an input signal and a process model signal and generate a first control signal;
     a process model configured to model a controlled process and generate the process model signal, the process model operative to receive the output of the first controller so that the process model and the first controller form a forward path of the partitioned control loop; and
   a main control loop, comprising:
     a second controller operative to receive an error signal proportional to the difference between the process model signal and a process output signal and generate a second control signal; and
     a summing circuit operable to sum the first and second control signals to generate a process control signal operative to control the controlled process.

34. The control structure of claim 33, wherein the partitioned control loop is configured so that the process model generates the process model signal independently of feedback from the main control loop.

35. The control structure of claim 33, wherein the main control loop is configured so that the process output signal is proportional to the output of the controlled process and a disturbance.

36. A control structure for controlling a process based on a set point, comprising:
   a process model configured to model the process and generate a process model signal;
   a first controller operable generate a process model control signal to drive the process model to the set point; and a second controller operable to receive a difference signal proportion to the difference between the process model signal and a process signal and generate a first process control signal, the process signal proportional to a process output;

wherein the first controller is isolated from the signal proportional to the process output.

37. The control structure of claim 36 wherein the first process control signal and the process model signal are summed to generate a second process control signal to control the process.

38. The control structure of claim 36 wherein the process model and the first controller are configured in a partitioned control loop so that the first controller receives feedback from the process model.

39. The control structure of claim 38, wherein partitioned control loop is configured so that the process model generates the process model signal independently of feedback from the process.

* * * * *